United States Patent [19]

Johannsen

[11] 4,160,501

[45] Jul. 10, 1979

[54] SIDE-FOLD CONVEYOR

[76] Inventor: Thorkil J. Johannsen, 2480 Mississauga Rd., Mississauga, Ontario, Canada

[21] Appl. No.: 824,009

[22] Filed: Aug. 12, 1977

[30] Foreign Application Priority Data

Jul. 19, 1977 [CA] Canada ................................. 283012

[51] Int. Cl.² ....................... B65G 21/00; B65G 41/00
[52] U.S. Cl. ..................................... 198/632; 198/313
[58] Field of Search ............... 198/313, 317, 825, 830, 198/839, 862, 864, 632

[56] References Cited

U.S. PATENT DOCUMENTS

| 3,034,635 | 5/1962 | Starr | 198/311 |
|---|---|---|---|
| 3,444,987 | 5/1969 | Palmer | 198/313 |
| 3,856,133 | 12/1974 | Dyachkov | 198/825 |

FOREIGN PATENT DOCUMENTS 971692  9/1964  United Kingdom ..................... 198/313

*Primary Examiner*—Robert B. Reeves
*Assistant Examiner*—Jeffrey V. Nase
*Attorney, Agent, or Firm*—Arne I. Fors

[57] ABSTRACT

An improved conveyor comprising an endless belt mounted for travel on a novel support structure permitting substantially horizontal pivotal movement about upright axes of one or both ends of the support structure from a collapsed side-by-side position to longitudinal alignment with each other whereby the endless belt folds about its longitudinal medial axis and then transversely upon itself about said upright axes.

2 Claims, 4 Drawing Figures

SIDE-FOLD CONVEYOR

BACKGROUND OF THE INVENTION

The present invention relates to a belt conveyor and is particularly directed to a belt conveyor structure capable of being folded sideways in a horizontal plane.

Conventional conveyors having endless belts mounted for travel over and about drive and idler rolls journalled in a supporting rigid steel framework usually are shortened by folding in a vertical plane about a horizontal pivot in order to fold the belt transversely to the longitudinal axis of the belt. This necessitates the need for a cable or hydraulic mechanism for elevating the belt and supporting structure through a vertical plane both for folding the structure for storage or transportation and for extending the structure for use.

It is known to extend and retract sections of belt conveyors by horizontal swinging movement of conveyor frame components about vertical pivots. However, as exemplified in U.S. Pat. No. 3,034,635 issued May 15, 1962, separate endless conveyor belts are independently mounted for movement in each frame component necessitating a separate drive or connecting drive between components to drive each of the endless belts at a common linear speed.

SUMMARY OF THE INVENTION

The structure of the present invention permits folding of an endless conveyor belt upon itself in a substantially horizontal plane about a vertical axis thereby obviating the need for a lifting mechanism, as is used in vertical folding of conveyor belts, or the need for separate belts pivotal from each other requiring independent or interconnecting complex drive mechanisms. In general, the improved conveyor structure of my invention comprises an elongated hollow truss structure having a plurality of longitudinally spaced idler rolls journalled for rotation transversely thereof along its length, an elongated endless flexible belt mounted on said rolls and extending from one end of said truss structure to the other for travel in one direction on said rolls and return in the opposite direction below said rolls within the truss structure, said truss structure comprising at least two sections pivotally joined together about an upright axis intermediate the ends of the truss structure for substantially pivotal horizontal movement about said axis whereby one of said sections is swingable from a collapsed position side-by-side the other section to an extended position in longitudinal alignment with the other section and whereby said belt on the rolls can fold longitudinally and transversely upon itself substantially about said upright axis and the belt below the rolls is free to turn in a vertical plane about said upright axis when said truss structuure is in a collapsed position.

A principal object of the present invention therefore is the provision of an improved conveyor structure which can be folded substantially horizontally upon itself without the need for a complex actuating mechanism and whereupon an endless conveyor belt extending from one end of the conveyor structure to the other can be folded upon itself.

BRIEF DESCRIPTION OF THE DRAWINGS

The foregoing and other objects of the invention and the manner in which they can be attained will become apparent from the following detailed description with reference to the accompanying drawings, in which.

DESCRIPTION OF THE PREFERRED EMBODIMENT

Figure 2:
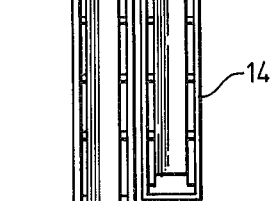
FIG. 2 is a plan view of the conveyor structure of FIG. 1 with one end extended to an operable position.
Figure 1:
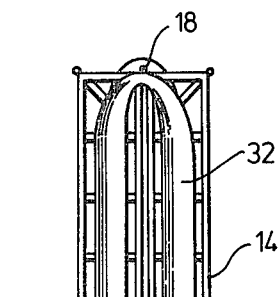
FIG. 1 is a plan view of a conveyor structure showing opposite ends folded upon the central portion thereof.

With reference now to FIGS. 1 and 2 of the drawings, the conveyor structure of the present invention comprises a central frame section 10 having a pair of wing frame components 12, 14 hinged at upright pivot axes 16, 18 respectively onto main central section 10 supported by wheels 19 for horizontal swinging movement about axes 16, 18. The frame essentially comprises a conventional steel truss made of longitudinal corner angle members 20 with transverse and diagonal reinforcing angle members 22, 24 welded or bolted together to form an integral structure. Idler rolls 26 are transversely mounted at an equal spacing along frame section 10 and wing sections 12, 14 for rotation by journaling in supports 30.

Endless conveyor belt 32 is driven by a motor mounted in main frame component 10 in conjunction with drive chains or V-belts and drive rolls, not shown, which are well known in the art.

Figure 3:
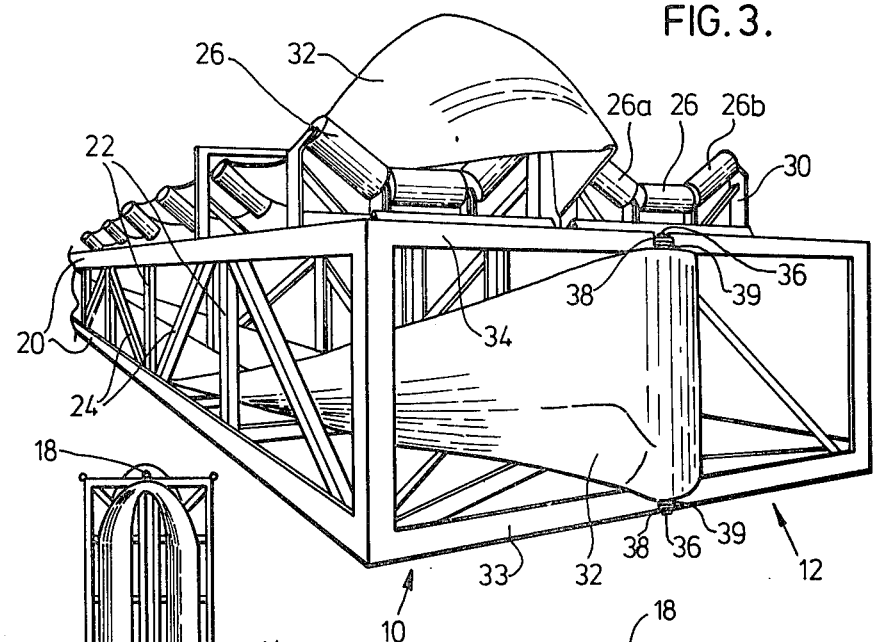
FIG. 3 is a perspective view of one end of said conveyor structures in its folded position illustrating the manner in which the conveyor belt folds.

Turning now to FIG. 3, each of axes 16, 18 comprises a hinge pin 36 mounted in hinges 38 secured to one side of main section 10 and in hinge 39 secured to wings 12, 14 for pivotal movement from the collapsed side-by-side position shown in FIG. 1 to the extended position by wing section 12 in longitudinal alignment with central section 10 as shown in FIG. 2. A lock 40 having pin 41 slidably mounted in sleeves 42, 44 attached to wing 12 secures the abutting ends of the section together by engagement with a mating sleeve, not shown, attached to section 10 to secure the assembly in its operative extended position.

Figure 4:
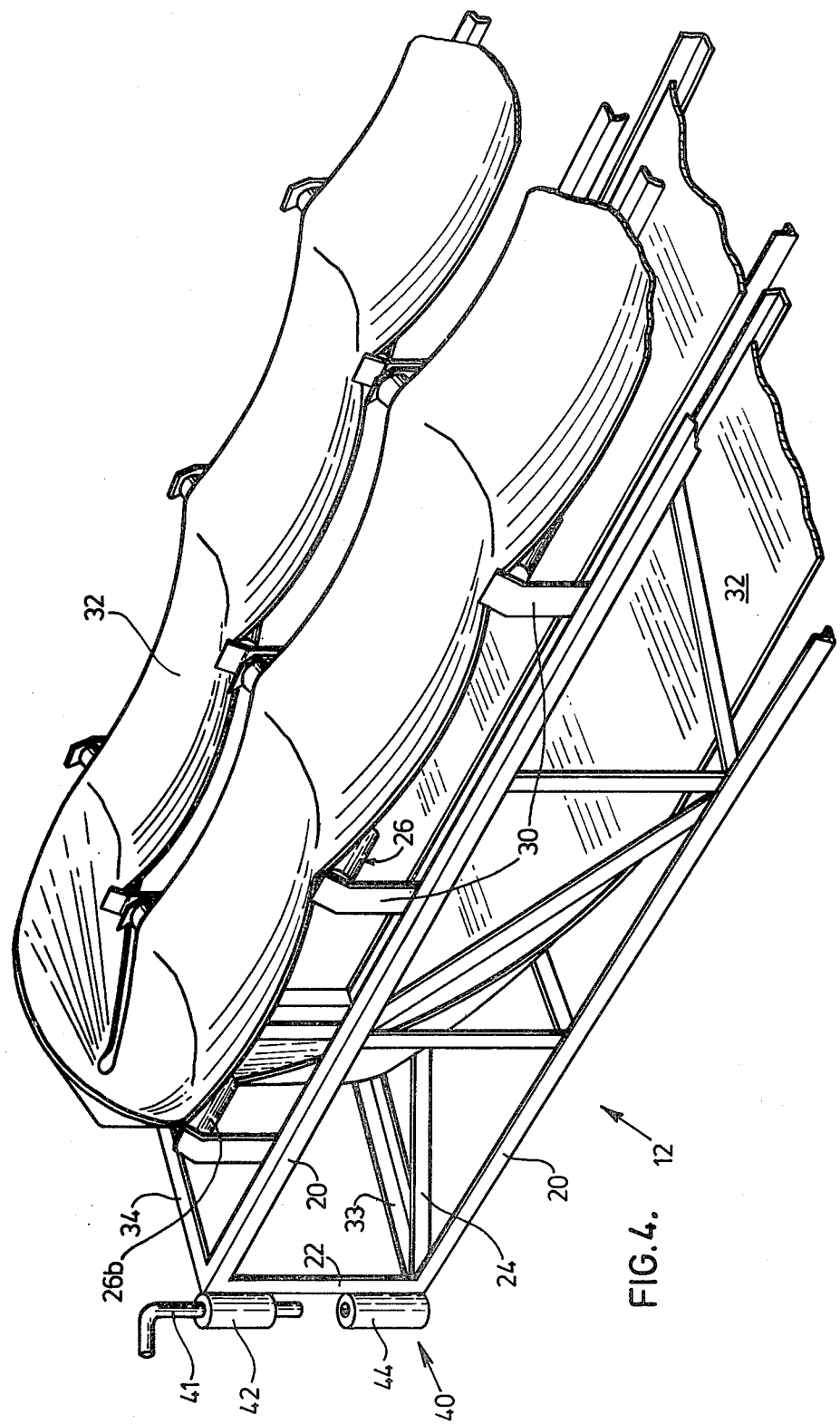
FIG. 4 is another perspective view of the portion of the structure shown in FIG. 3.

It will be noted from FIGS. 3 and 4 that the portion of belt 32 seated on idler rolls 26 and assuming an elongated trough shape due to the bias of the extremities 26a and 26b of rolls 26 is first partially folded about its longitudinal medial axis and then transversely upon itself at pivot axis 16 illustrated. As shown in FIGS. 1 and 2, the belt 32 can foreshorten at axes 16, 18 since no vertical belt obstructions are present at adjacent upper idler rolls 26. The return portion of belt 32, contained within sections 10, 12 illustrated, is drawn from a horizontal plane to a vertical plane about hinge pin 36 at axis 16, for example, to permit pivotal movement of wing sections 12, 14 about central section 10. The clear height of the transverse truss components 33, 34 must be sufficient to accommodate the substantial width of belt 32 such that it is free to stand upright.

Although the structure of the present invention has been illustrated in connection with a conveyor apparatus having wing sections at each end of the structure, it will be understood that the conveyor apparatus could be pivotally connected at a centre point or in proximity to one end only.

It will be understood of course that modifications can be made in the embodiment of the invention illustrated and described herein without departing from the scope and purview of the invention as defined by the appended claims.

What I claim as new and desire to protect by Letters Patent of the United States is:

1. An improved conveyor comprising an elongated hollow truss structure having a plurality of longitudinally spaced idler rolls journalled for rotation transversely thereof along its length, said plurality of idler rolls arranged to form an elongated trough shape, an elongated endless flexible belt mounted on said rolls and extending from one end of said truss structure to the other for travel in one direction on said rolls and return in the opposite direction below the rolls within the truss structure, said truss structure comprising at least two sections pivotally joined together about an upright axis intermediate the ends of the truss structure, said axis free of vertical belt obstructions in proximity to adjacent upper idler rolls, for substantially pivotal horizontal movement about said axis whereby one of said sections is swingable from a collapsed position side-by-side the other section to an extended position in longitudinal alignment with the other section and whereby said belt on the rolls folds longitudinally and transversely upon itself substantially about said upright axis and foreshortens to release belt tension and the belt below the rolls is free to turn in a vertical plane about said upright axis when said truss structure is in a collapsed position.

2. An improved conveyor as claimed in claim 1, said elongated truss structure comprising a central frame section having a wing section hinged at each end of the said central frame section at upright pivot axes whereby said wing sections are swingable from a collapsed position side-by-side the central frame section to an extended position in longitudinal alignment with each other and whereby said belt can fold longitudinally about its longitudinal medial axis and then transversely upon itself substantially about said upright axes when the truss structure is in a collapsed position.

* * * * *